United States Patent
Wiesen et al.

(10) Patent No.: US 8,736,995 B1
(45) Date of Patent: May 27, 2014

(54) IDENTIFYING TRACK PITCH CAPABILITY OF A RECORDING DEVICE

(71) Applicant: Seagate Technology LLC, Cupertino, CA (US)

(72) Inventors: Kurt Wiesen, Lyons, CO (US); Randall Bauck, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/019,217

(22) Filed: Sep. 5, 2013

(51) Int. Cl.
*G11B 5/02* (2006.01)

(52) U.S. Cl.
USPC .................................. 360/27; 360/31; 360/53

(58) Field of Classification Search
None
See application file for complete search history.

(56) References Cited

U.S. PATENT DOCUMENTS

| | | |
|---|---|---|
| 5,691,857 A | 11/1997 | Fitzpatrick et al. |
| 7,170,700 B1 | 1/2007 | Lin et al. |
| 7,457,075 B2 | 11/2008 | Liu et al. |
| 7,567,397 B2 | 7/2009 | Lu |
| 7,706,096 B2 | 4/2010 | Ito et al. |
| 7,889,453 B2 | 2/2011 | Melrose |
| 8,125,724 B1 | 2/2012 | Nichols et al. |
| 8,194,338 B1 | 6/2012 | Zhang |
| 2004/0080845 A1 | 4/2004 | Yeo et al. |
| 2011/0075290 A1 | 3/2011 | Hobbet |

*Primary Examiner* — Paul Huber
(74) *Attorney, Agent, or Firm* — Hall Estill Attorneys at Law

(57) ABSTRACT

Method and apparatus for identifying the track pitch capability of a recording device, such as but not limited to a recording system and/or a servo control system in a data storage device. In accordance with some embodiments, data are written to first and second tracks at an initial track pitch such that the second track at least partially overlaps the first track. Data are arranged on the first track in code words each having a fixed plurality of bits which are decoded as a group by a data channel. The code words are transferred from the first track to the data channel, and a final track pitch for subsequent tracks is responsive to a distance at which nominally half of the code words are undecodeable by the data channel.

20 Claims, 6 Drawing Sheets

IDENTIFYING TRACK PITCH CAPABILITY OF A RECORDING DEVICE

SUMMARY

Various embodiments of the present disclosure are generally directed to identifying the track pitch capability of a recording device, such as but not limited to a servo control system and/or a recording system in a data storage device.

In accordance with some embodiments, data are written to first and second tracks at an initial track pitch such that the second track at least partially overlaps the first track. Data are arranged on the first track in code words each having a fixed plurality of bits which are decoded as a group by a data channel. The code words are transferred from the first track to the read channel, and a final track pitch for subsequent tracks is responsive to a distance at which nominally half of the code words are undecodeable by the data channel.

These and other features and aspects which characterize various embodiments of the present disclosure can be understood in view of the following detailed discussion and the accompanying drawings.

DETAILED DESCRIPTION

Figure 1:
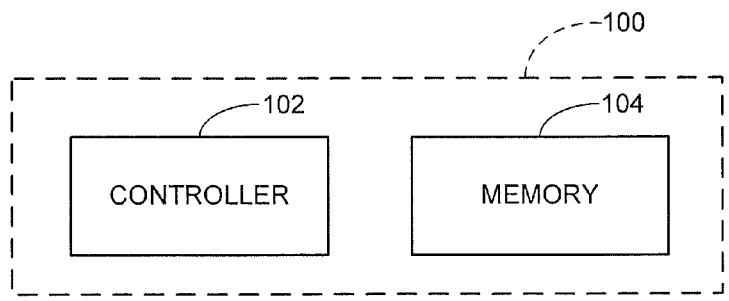
FIG. 1 is a functional representation of a data storage device.

Control systems can be used to move control objects from an initial position to a destination position and/or to maintain the control object in a desired relation to another object/location. Hard disc drives, for example, are a type of data storage device that often use a closed-loop control system to position data read/write transducers in proximity to tracks on rotatable magnetic data recording media in order to transfer data between the tracks and a host device.

The data storage capability of a given media recording surface depends in part on the data density along each track, as well as the track density (e.g., the number of tracks per unit of radial width such as tracks per inch, TPI). Factors which determine the TPI can be separated into the two main groups of recording sub-system (RSS) (e.g., head, disk, preamp, read channel) and servo-mechanical. It can be appreciated that increases in areal data density can be achieved by increasing TPI, which necessarily brings the centerlines of adjacent tracks closer together. Increasing TPI, however, may make the servo reliability or error rate of the recording system more susceptible to track misregistration (TMR) which involves misalignments of the transducer with an associated track.

A position error signal (PES) can be generated to identify the amount of TMR at a given time and to provide correction inputs to bring the transducer back into desired alignment with a given track. TMR errors can arise from a number of factors, including operational aspects of the recording subsystem or the servo-mechanical control system. TMR can also arise from external effects, such as through the application of externally generated vibration to a device.

TMR can have repeatable runout (RRO) and non-repeatable (NRRO) components. RRO components are persistent and generally repeat over each rotation of the media surface. NRRO components can be both persistent and non-persistent, and are generally different over each rotation of the media surface.

In the past, achievable TPI for a given system has often been established by indirect measurements of available parameters such as PES, read/write faults, measured bit error rates (BER), etc. Such measurements are often limited in terms of separating out RSS and servo-mechanical effects and RRO versus NRRO components in the system, leading to poor understanding and a non-optimum TPI solution.

Accordingly, various embodiments of the present disclosure are generally directed to a method and apparatus for identifying a track pitch capability of a recording device and its key constituents, such as but not limited to a servo control system or a data recording system of a data storage device.

As explained below, in some embodiments a system is configured to write first data to a target track, write second data to an aggressor track adjacent the target track, and evaluate a recovery rate of the first data. A baseline track pitch value is determined in relation to the recovery rate independently of track misregistration (TMR) associated with the first or second tracks.

In some embodiments, the baseline track pitch value is determined as a radial separation distance between the respective tracks at which half (50%) of the data on the target track is unrecoverable due to track squeeze or encroachment by the aggressor track. The baseline track pitch value thus represents the minimum track pitch that could be used in the absence of TMR (e.g., a "perfect" or "ideal" system).

TMR and RSS compensation values can be combined with the baseline track pitch value to set a final track value (e.g., TPI) for the system. In other embodiments, written in runout (WIRRO) components, repeatable runout components permanently written into the magnetic recording medium during the servo pattern writing process, can be directly measured by repeating the above operations on a data block (e.g., code word, sector, etc.) basis to determine the point at which each of the data blocks becomes unrecoverable due to track squeeze. One or more final track pitch values can be established in relation to the determined WIRRO. RSS compensation values include the effects of circumferential non-uniformity and repeated writing of the same track.

While the system has applicability to closed loop servo control systems in data storage devices, the system can be readily adapted for other types of operational environments These and other features of various embodiments can be understood beginning with a review of FIG. 1 which provides a functional block representation of a data storage device 100. The device 100 includes a controller 102 and a memory 104. The controller 102, sometimes referred to as a processor or a processing circuit, can take a variety of forms such as a hardware based control circuit or a general purpose programmable processor having suitable programming to provide top level control for the device. The memory 104 can take a variety of forms such as rotatable magnetic or optical data recording media (discs), solid-state flash memory, hybrid memory modules (e.g., both rotatable and solid-state), etc.

Figure 2:
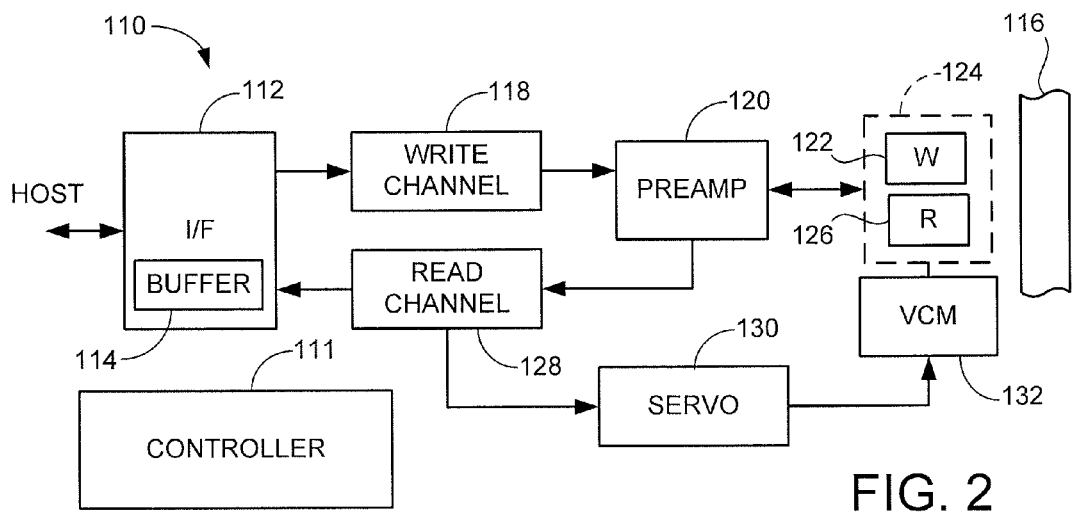
FIG. 2 is a functional representation of another data storage device.

FIG. 2 is a functional block diagram for a data storage device 110 that may correspond to the device 100 of FIG. 1 in accordance with some embodiments. The data storage device 110 is characterized for purposes of the present disclosure as a hard disc drive (HDD) that employs magnetic recording to store data from a host device (not separately shown). The HDD may use a variety of recording technologies such as but not limited to heat assisted magnetic recording (HAMR), perpendicular recording, bit patterned media, etc. Such are merely exemplary and are not limiting.

The device 110 in FIG. 2 includes a top level controller 111 that may be realized in hardware or firmware. The controller 111 may also be referred to as a processor or a processing circuit. An interface circuit (I/F) 112 communicates with the host device and includes a data buffer 114 to temporarily store data pending transfer between the host device and a rotatable data recording medium 116.

A write channel 118 operates to encode input write data from the host to provide a serialized data stream to a preamplifier/driver (preamp) 120. The preamp 120 provides a sequence of write currents to a magnetic write element (W) 122 of a data transducer 124 to write data to the medium 116.

During a readback operation, readback signals are transduced by a read element (R) 126 of the data transducer 124. The transduced signals are supplied to the preamp 120. The preamp 120 conditions and amplifies the readback signals and provides the same to a read channel 128. The read channel 128 applies signal processing techniques to recover the originally stored data to the buffer 114 pending subsequent transfer to the host.

During both read and write operations, specially configured servo positioning data provided to the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116.

Figure 3:
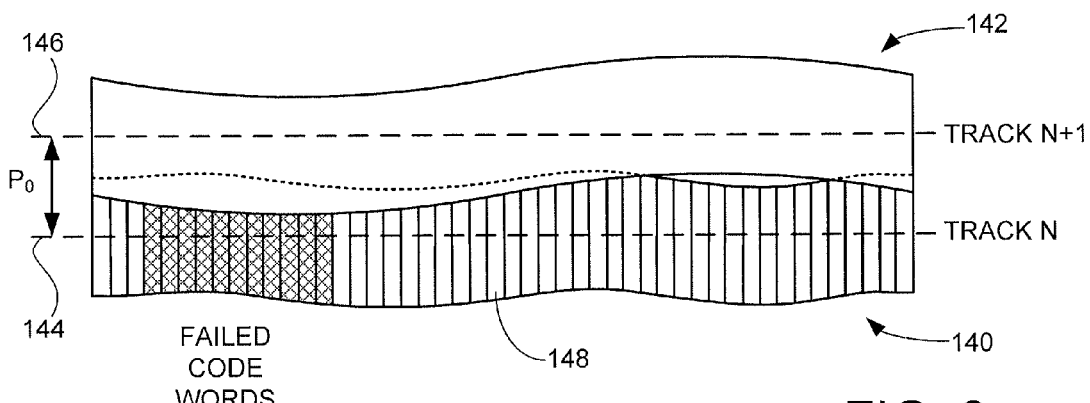
FIG. 3 shows adjacent tracks in the device of FIG. 2.

FIG. 3 shows two tracks 140, 142 defined on a recording surface of the medium 116 of FIG. 2. The tracks are identified as track N and track N+1. Track N is sometimes referred to as the target track and is written first. Track N+1 is sometimes referred to as the aggressor track, is written second, and partially overlaps the first track N.

Each of the tracks 140, 142 vary about nominal centerlines 144, 146, which are separated by a nominal track pitch P0. Each of the centerlines 144, 146 are at a fixed radius and represent an ideal circular path around the center of the medium 116. The tracks 140, 142 vary radially about these centerlines 144, 146 due to a number of repeatable runout (RRO) and non-repeatable runout (NRRO) components. RRO components contribute to head to track misregistration that is the same over each revolution of the medium. NRRO components vary over each revolution of the medium.

The RRO components include errors due to the placement of the servo data used by the servo circuit 130 (FIG. 2) to define the tracks. The servo data define somewhat "wavy" centerlines that deviate from the ideal centerlines 144, 146, and these variations will be experienced over each revolution. NRRO components arise due to a number of factors associated with the recording subsystem (e.g., read head, etc.), the servo-mechanical system (servo, VCM, etc.), and external sources (externally generated vibration, etc.). These NRRO components influence the ability of the servo control circuit to cause the write transducer 122 to be positioned to write data along the centerlines of the tracks.

Each track stores data in the form of data blocks, or groups of bits. The data blocks can be arranged in a variety of ways, such as in the form of fixed sized, addressable data sectors. In some cases, the data blocks can be characterized as code words (CWs) 148, which represent a selected number of bits that are processed by the read channel 128 as a unit. The code words can be aligned with sector boundaries (e.g., two CWs per sector, etc.), or can be established independently of the sector boundaries. An example implementation might use about 1000 code words per track, with about 15,000 bits in each code word. Other arrangements can be used Instead of detecting individual bits, the read channel 128 can operate to detect all of the bits in each code word 148 during an initial code word recovery operation. Either every bit in a given code word can be detected, or none of the bits in the code word will be detected. The bit density should be such that the code word is readily recovered in the absence of adjacent track squeeze or encroachment. If successfully detected, subsequent data decoding operations, are carried out to recover the originally stored data. The method can be applied to any read channel implementation where the bits are grouped and a pass fail threshold is applied so long as adjacent track encroachment is the dominant failure mechanism (e.g., LDPC iterative channels, non-iterative channels with Reed-Solomon ECC, SNR measurement with a suitable threshold, etc.).

If the initial code word recovery operation fails, a read retry operation may be carried out in an effort to recover the code word during a subsequent rotation of the medium 116. TMR during the read process is a confounding effect for this measurement and can be eliminated by doing multiple reads at different read offsets to see if there is any read location where the codeword can be recovered.

FIG. 3 shows that a number of the code words 148 were unsuccessfully recovered ("failed code words"), as depicted in cross-hatch fashion. The dominant factor to the failed code words is the localized encroachment of track 142 onto the data of track 140 in this region.

Figure 4:
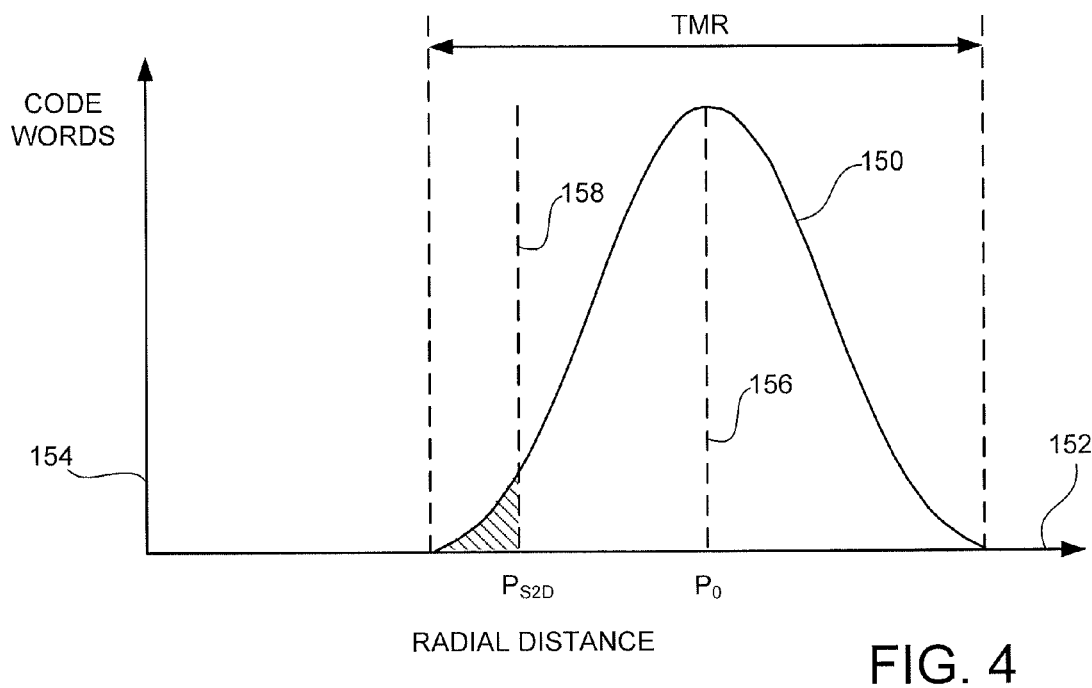
FIG. 4 is a graphical distribution of failed code words from the adjacent tracks of FIG. 3.

FIG. 4 depicts a code word distribution curve 150 generally corresponding to the code words 148 of FIG. 3. The curve 150 is plotted against a radial distance x-axis 152 and a code word population count y-axis 154. The curve 150 generally takes a Gaussian shape although this is merely exemplary and is not limiting, as other distribution forms can be observed and any symmetric distribution will work The center of the distribution is denoted by broken line 156 and corresponds to the radial separation (track pitch) P0 from FIG. 3. The area under the curve 150 thus represents the distribution of the code word' track pitches about the centerline 144 on track N (track 140), and the 6σ width of the distribution generally corresponds to the overall TMR variation of the track.

Broken line 158 denotes a second, smaller track pitch value $P_{S2D}$ (where S2D refers to "squeezed to death"). The $P_{S2D}$ value relates to the encroachment of the target track N by the aggressor track N+1; the cross-hatched area bounded by line 158 and curve 150 generally corresponds to the number of code words on track N that failed due to track squeezing by track N+1. A code word failure rate (CWFR) can be calculated as follows:

$$CWFR = ((FCW)/(TCW))(100) \qquad (1)$$

where FCW represents the total accumulated number of failed code words, TCW represents the total number of code words on the target track, and CWFR is expressed as a percentage.

The value $P_{S2D}$ thus corresponds to the minimum spacing between the respective target and aggressor tracks N, N+1 in the absence of TMR and ignoring secondary RSS effects to be discussed later. That is, assuming that both tracks were written so as to be perfectly circular and aligned along the respective ideal centerlines 144, 146 (see FIG. 3), the distribution 150 would represent an impulse function centered at the center point $P_0$, and the distance $P_{S2D}$ would constitute the minimum track pitch where all of the code words on track N were fully recoverable (e.g., CWFR=0%). $P_{S2D}$ depends only RSS effects and is independent of servo-mechanical effects.

It can be seen that by moving the curve 150 to the right in FIG. 4, the distance between the tracks N, N+1 would increase and the CWFR (area bounded by line 158) would decrease. Conversely, moving the curve 150 to the left in FIG. 4 would decrease the track pitch between tracks N, N+1 and increase CWFR. FIG. 4 thus shows the relationships between track pitch, TMR and CWFR.

Figure 5:
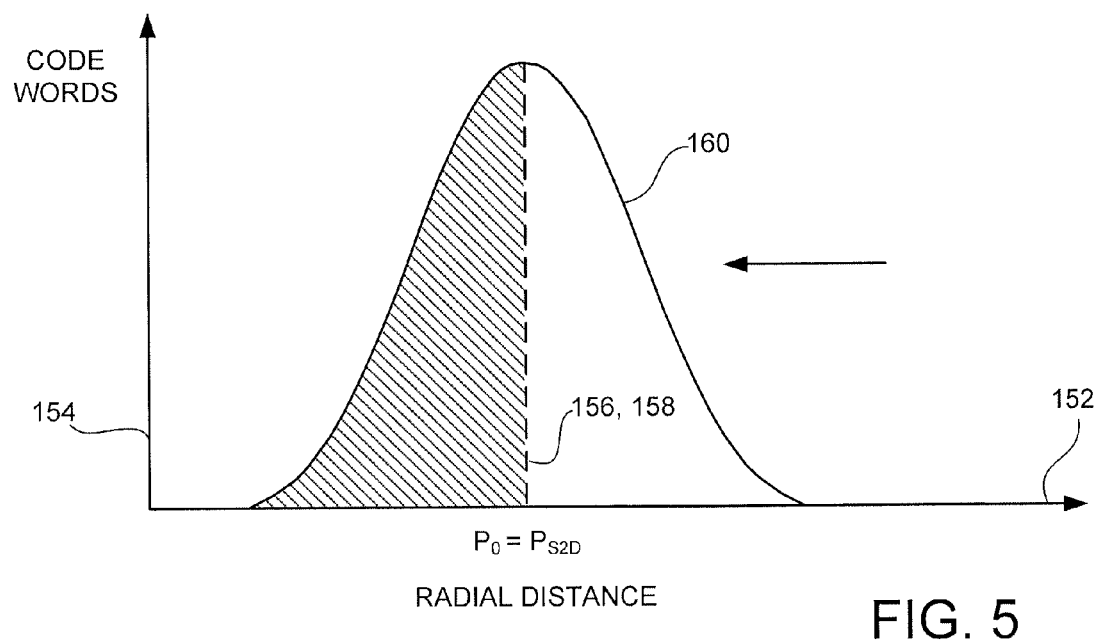
FIG. 5 is another graphical distribution related to FIG. 4.

Curve 160 in FIG. 5 generally corresponds to curve 150 in FIG. 4. In FIG. 5, the curve 160 has been shifted so as to align the center point $P_0$ of the distribution with the $P_{S2D}$ distance; that is, centerline 156 in FIG. 4 has been moved so as to be coextensive with line 158. At this point, $P_0=P_{S2D}$ and CWFR=50% (nominally half the code words failed on track N).

This point can be determined by successively writing tracks N and N+1 at smaller and smaller track pitches until nominally half of the code words on track N are found to be failed code words during the initial code word recovery process. By doing this, the $P_{S2D}$ value can be identified as the minimum track pitch that could be used in an ideal system as described above that did not include TMR. It will be noted that this value is independent of the width of the distribution, since the area bounded by lines 156, 158 and curve 160 (the cross-hatched half to the right) nominally represents half of the total area under the curve 160. Once this baseline ideal track pitch value is determined, a final track pitch value that compensates for the actual TMR and secondary RSS effects in the system can be derived, as explained below.

Figure 6:
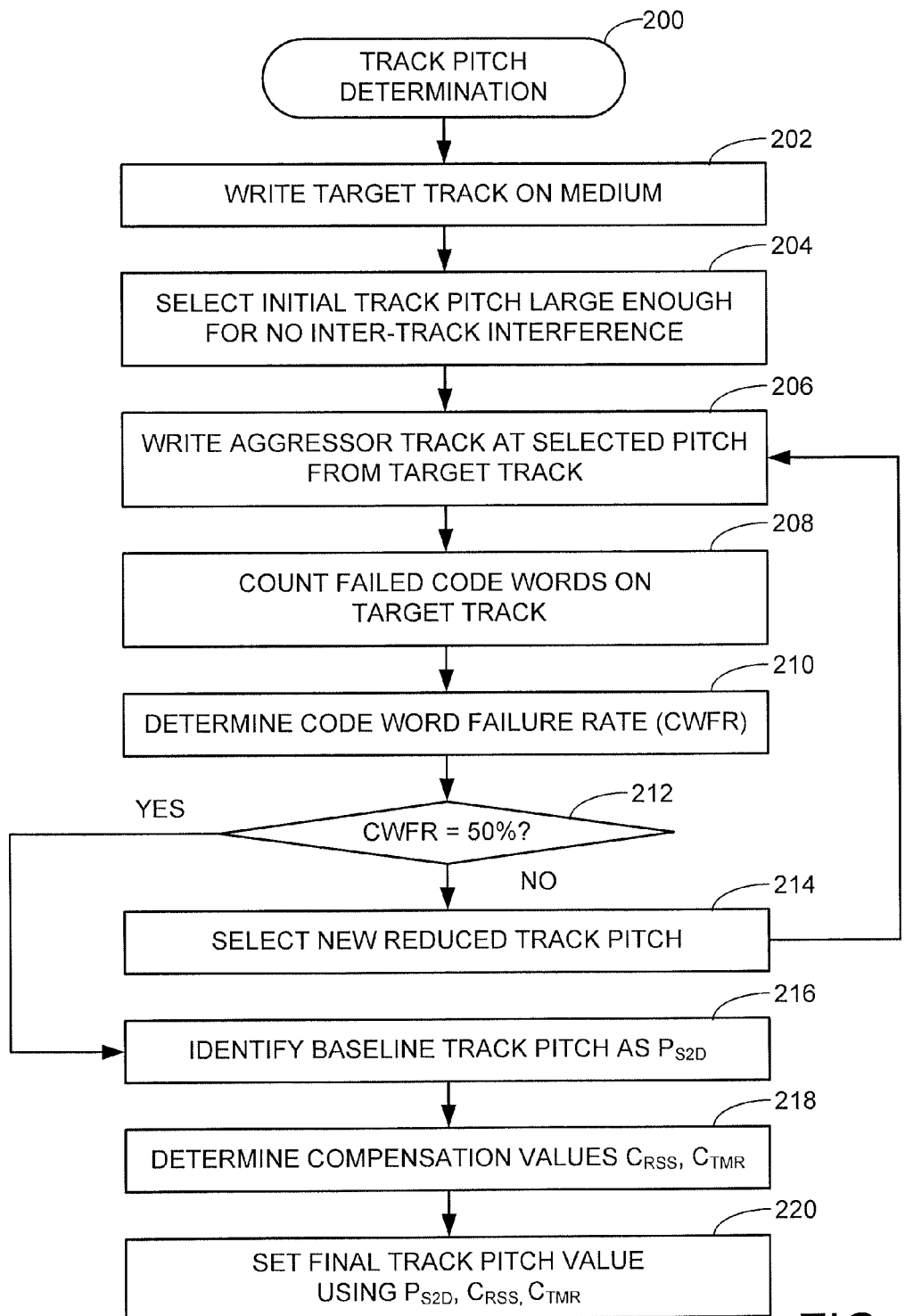
FIG. 6 is a flow chart for a TRACK PITCH DETERMINATION routine carried out in accordance with some embodiments.

One way in which a final track pitch value can be determined is set forth by a TRACK PITCH DETERMINATION routine 200 in FIG. 6. For purposes of illustration, the routine will be discussed in terms of the data storage device 110 of FIG. 2 and the representative tracks N, N+1 in FIG. 3. Other applications of the routine can be used.

At step 202, the system initially operates to write a target track to a medium, such as the target track N (FIG. 3) which is written to the medium 116 (FIG. 2) using the write transducer 122, servo control circuit 130, VCM 132, etc. It will be appreciated that prior to step 202, servo data (not separately shown) may be first written to the medium to define the placement of the track, so that the data track is written while the control system is controlling the head position using this servo data. As noted above, this servo data may vary with respect to an ideal centerline (e.g., line 144, FIG. 3). Some amount of TMR will thus be present in the written target track.

At step 204, an initial track pitch for an aggressor track N+1 may be selected to provide no inter-track interference with track N. This can be performed empirically, such as by selecting a large value (2× the nominal track pitch, etc.). A total count of failed code words on the target track N is next performed at step 208. This can include using the servo control circuit 130 to position the read transducer 126 (FIG. 2) so as to follow the servo data associated with track N, and using the read channel code word recovery process to detect the bits in each subsequently received code word with rereads as necessary to eliminate the effects of TMR during reading. Other mechanisms can be used as well, such as by counting failed sectors, counting the total number of failed uncorrected bits, etc. It will be noted that, initially, the first distance between the tracks should be selected to be great enough so that no code words are failed from the target track. This provides a valid baseline to subsequently evaluate the failure of code words as the aggressor track is brought closer and closer to the target track.

The then-existing code word failure rate (CWFR) is next determined at step 210. This can be carried out using equation (1) set forth above. Decision step 212 determines whether the CWFR is nominally equal to 50%. If not, the routine passes to step 214 where a new, reduced track pitch is selected and the foregoing steps are repeated.

This process is continued successively until such time that the CWFR is nominally equal to 50%. At this point the routine passes from step 212 to step 216 where the most recently selected track pitch value (from step 214) is identified as the value $P_{S2D}$ (or more accurately via interpolation). As noted above, this distance generally corresponds to the minimum track pitch that could be used in the system in the absence of TMR (e.g., RRO and NRRO components).

RSS and TMR compensation values ($C_{RSS}$ and $C_{TMR}$) can be determined at step 218, or at other points in the process. The $C_{RSS}$ compensation value can be used to compensate for variations resulting from the recording system (e.g., variations in $P_{S2D}$ caused by multiple writes on the aggressor track or circumferential magnetic property variations), and the $C_{TMR}$ compensation values can be used to compensate for misregistration resulting from the servo-mechanical system. Individual compensation values for these terms can be generated and used. These can be selected in a variety of ways. In some cases, a scalar compensation value can be used, such as a percentage of the nominal drive track pitch $TPI_{NOM}$ value as follows:

$$C_{TMR}=TPI_{NOM}(X)/100$$

$$C_{RSS}=TPI_{NOM}(Y)/100 \qquad (2)$$

where X and Y are a derating percentage, such as 15%. Alternatively, some baseline value such as Z micrometers, μm can be selected as the $C_{TMR}$ or $C_{RSS}$ value. In other embodiments, a single compensation value can be generated and used that compensates for both RSS and TMR effects.

A final track pitch value $P_F$ is thereafter set at step 220, such as in accordance with the following relation:

$$P_F=P_{S2D}+C_{RSS}+C_{TMR} \qquad (3)$$

where PF is thereafter used as the final track pitch (spacing) for subsequently written tracks on the medium 116. If a single compensation value is used, this can be combined with the $P_{S2D}$ value as set forth by equation (3) to arrive at the final track pitch $P_F$.

In some cases, the same $P_F$ value as derived from FIG. 6 can be used for all recording surfaces in the device 110. In other cases, a different $P_F$ value can be determined for each recording surface. In still other cases, each surface can be arranged into concentric zones of tracks and a different $P_F$ value can be determined for each zone.

As noted above, a feature of the routine of FIG. 6 is that a baseline track pitch can be identified that is independent of actual TMR in the system, and then compensation values can be empirically derived or calculated to compensate for the TMR and secondary RSS effects.

Figure 7A:
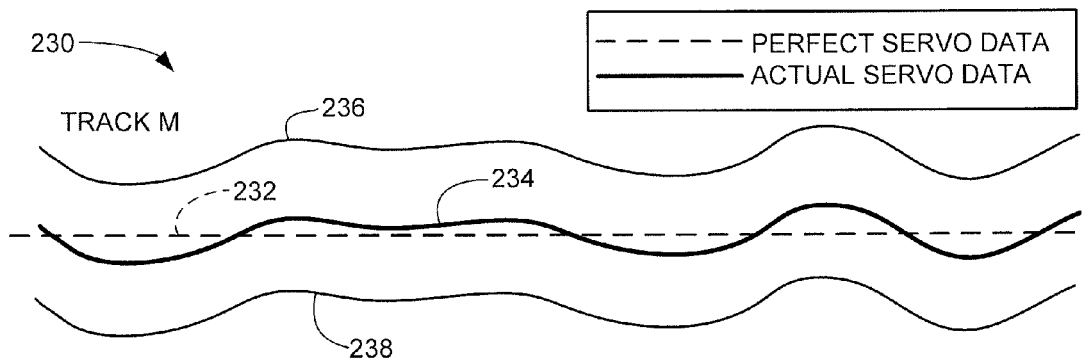
FIGS. 7A-7C depict aspects of a selected track of the data storage device of FIG. 2.
Figure 7B:
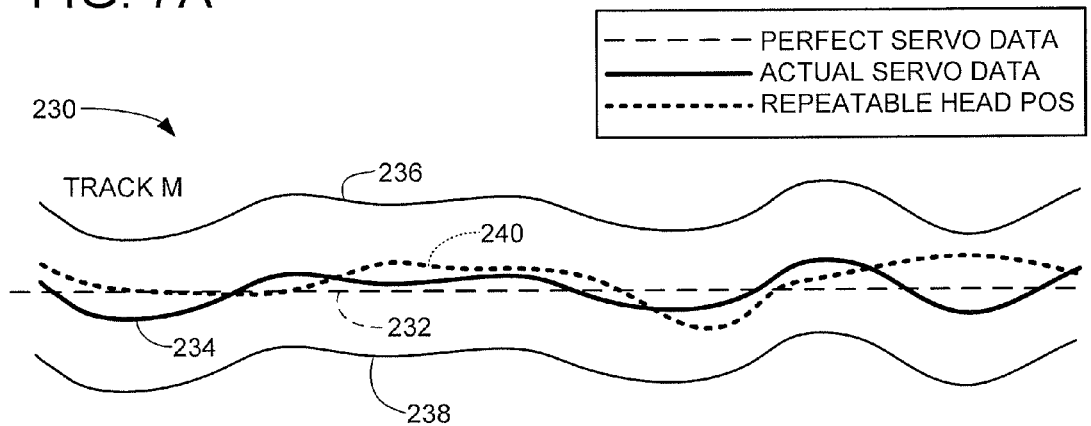
Figure 7C:
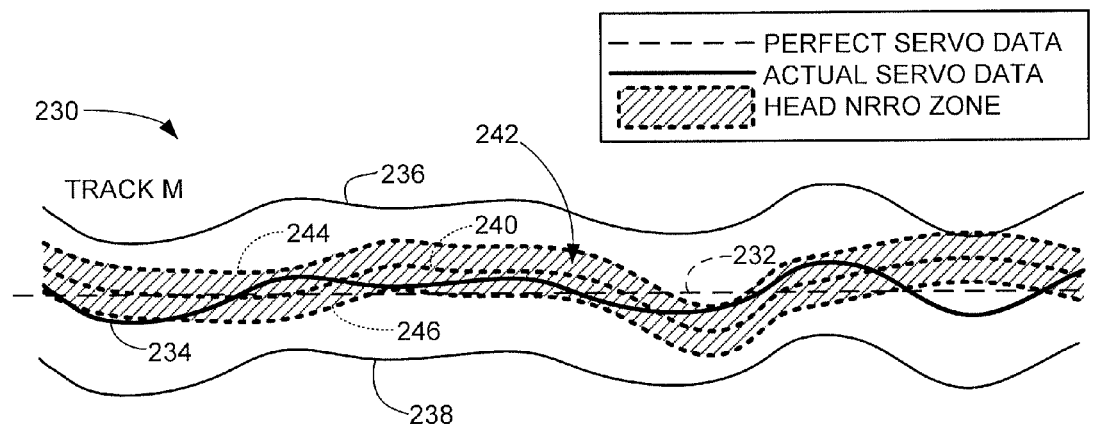

FIGS. 7A-7C depict another methodology in which actual RRO and NRRO components of the TMR can be assessed for combination with a baseline $P_{S2D}$ value. FIG. 7A depicts a target track 230, denoted as track M, written to a recording surface of the medium 116 (FIG. 2). As before, an ideal centerline for the target track M is denoted by broken line at 232. In an ideal system, both the servo data would follow this ideal line and the track would be perfectly centered about this line.

In practice, RRO components are introduced during the writing of the servo data, resulting in an actual servo centerline 234. The amount and extent of variation has been exaggerated for clarity. It is contemplated that line 234 represents the actual track definition from one servo field to the next along a circumferential path taken by the track, including the use of compensation to reduce the extent of such variations. In other words, the variations represented by line 234 represent the very "best" the servo system can do in terms of reducing RRO components. It is contemplated that the line 234 is made up of n discrete, spaced apart servo samples which are successively detected by the read transducer during servo following operations.

Lines 236 and 238 represent write fault threshold (WFT) values on each side of the servo centerline 234. The lines 236, 238 may represent some percentage of acceptable off-track deviation of the position of the write transducer (122, FIG. 2) during the writing of data to the target track 230. This value can vary but may be on the order of about +/−15% of a total track width value. Any suitable values can be used for the WFT values. A value referred to as the written-in repeatable runout (WIRRO), representative of the deviation between line 234 and line 232, can be expressed as follows:

$$WIRRO(n)=RTP(n)-L(n) \quad (4)$$

where WIRRO(n) is the distance between line 232 and line 234 for each servo sample n, RTP(n) is the real track position (radial location of each servo sample n along line 234) and L(n) is the radius of ideal centerline 232, which is a constant for all servo samples n.

FIG. 7B includes the target track 230 from FIG. 7A with the addition of a transducer path line 240. The line 240 represents a repeatable head position component for the transducer 124 (FIG. 2) as the servo control system attempts to make the transducer follow the servo line 234. It can be seen that the transducer 124 will undershoot and overshoot the servo line 234 over each revolution as the transducer attempts to follow the servo line. The line 240 represents a repeatable component of this operation based on the servo control response to the line 234.

FIG. 7C adds a banded area 242 to FIG. 7B, shown in cross-hatch fashion, with upper and lower band lines 242, 244 which nominally follow the RRO component line 240 from FIG. 7B. The banded area 242 generally represents an NRRO zone; that is, a potential area in which the transducer may be located as it attempts to follow the servo line 234. The radial width of the banded area (e.g., radial distance between upper and lower lines 242, 244) represents the addition of NRRO to the RRO component of head position. It is contemplated that FIG. 7C may represent a relatively low vibration environment, so the amount of potential NRRO TMR is relatively small relative to the WFT limits 236, 238. FIG. 7C may represent a bench environment (e.g., relatively isolated, controlled conditions during the operation of the device).

Although the NRRO area 242 provides uncertainty with regard to the actual position of the head over each revolution, the area 242 is nevertheless generally repeatable over each revolution; that is, the head will be somewhere within the banded area over each revolution, and likely at a different location within the banded area for each revolution. A position error signal, PES, can be provided as a control input to the servo control circuit 130 (FIG. 2) to enable servo following. PES can be expressed including as:

$$PES(n)=RTP(n)-RHP(n) \quad (5)$$

where PES(n) is the position error value (signal) for each servo sample n, RTP(n) is the radial location of each servo sample n (line 234) and RHP(n) is the actual (real) head position at each servo sample n. RHP(n) will fall within the area 242 in the environment of FIG. 7C.

Figure 8A:
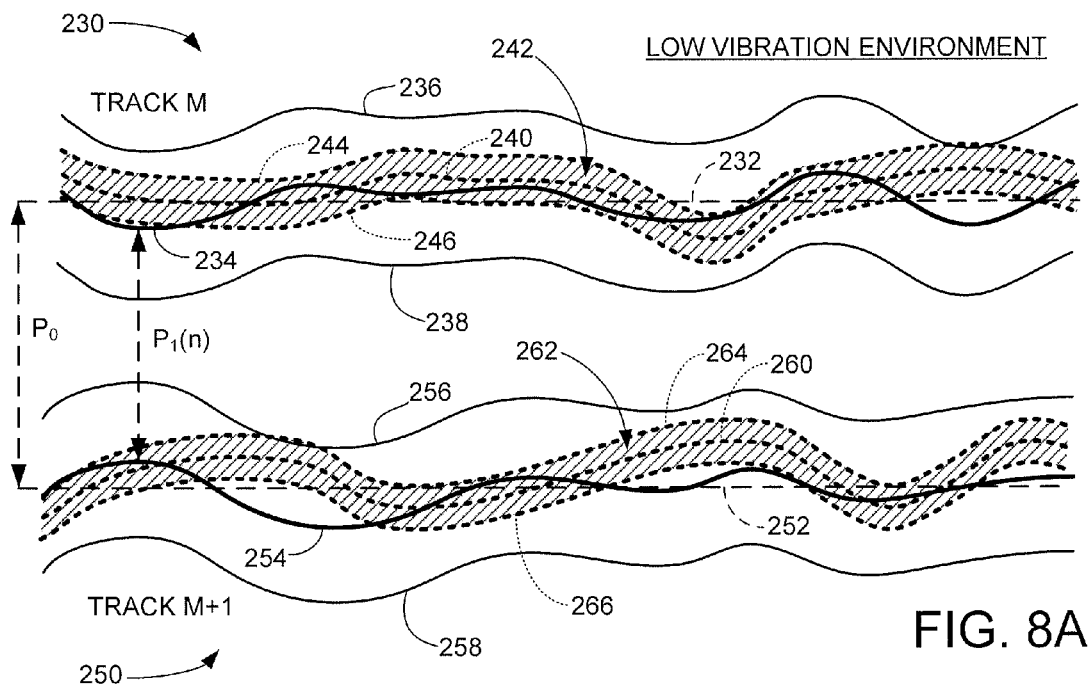
FIGS. 8A-8B depict aspects of a pair of adjacent tracks of the data storage device of FIG. 2.

FIG. 8A shows the target track 230 (track M) as depicted in FIG. 7C in conjunction with an aggressor track 250 (track M+1) written adjacent to the target track. The aggressor track 250 includes various corresponding features that are also present in the target track 230, including ideal centerline 252, actual servo line 254, upper and lower write fault thresholds (WFTs) 256 and 258, repeatable (RRO) head position line 260, head NRRO area 262, and boundary lines 264, 266.

It will be noted that the aggressor track 250 is provided with its own respective amounts of RRO and NRRO components which vary from those components in the target track 260. As in FIG. 7C, FIG. 8A represents a relatively low vibration environment so that both tracks M, M+1 have relatively narrow NRRO bands 242, 262.

The respective tracks M, M+1 are written at a track pitch $P_0$ as before, which can be expressed as:

$$P_0=L_{M+1}-L_M \quad (6)$$

Where $L_M$ is the radial location of ideal centerline 232 of track M and $L_{M+1}$ is the radial location of ideal centerline 252 of track M+1. Distance $P_1(n)$ represents the radial distance between the actual servo lines 234, 254. Unlike the fixed distance $P_0$, the distance $P_1(n)$ varies due to the respective RRO components incorporated into these two lines.

Accordingly, a term referred to as incoherent WIRRO, or IWIRRO, can be determined as follows:

$$IWIRRO(n)=WIRRO_{M+1}(n)-WIRRO_M(n)=P_1(n)-P_0 \quad (7)$$

Where IWIRRO(n) is the incoherent distance between the respective servo lines 234, 254 for each servo sample n, $WIRRO_M(n)$ is the written in RRO for servo line 234 in track M (equation (4) above), and $WIRRO_{M+1}(n)$ is the written in RRO for servo line 254 in track M+1. Stated another way, IWIRRO(n) is the distance between servo lines 234, 254 (e.g., $P_1(n)$) minus the ideal track pitch $P_0$.

Based on the discussion above in FIGS. 4-5, it can be seen that, assuming that track M+1 is written after track M, any code word (CW) on track M will fail if the centerline spacing between it and the corresponding code words on track M+1 is less than the distance $P_{S2D}$.

IWIRRO(n) can be determined for any two adjacent tracks in a number of ways, such as in relation to incoherent repeatable head position (IRHP) and PES. To measure IRHP repeat the basic steps of FIG. 6, but continue to reduce track pitch until a CWFR of 100% is achieved and record the track pitch at which each CW fails. Repeat this process for a statistically significant number of times. Doing this for a distribution as shown in FIG. 4 can be created for each CW where the width of the distribution is now determined only by NRRO. In this way a $P_{S2D,i}$ value is determined for each CW i by calculating the corresponding track pitch where CWFR=50%. The average of the $P_{S2D,i}$ values should equal the $P_{S2D}$ value previously referenced. In this way, the effects of NRRO have been removed.

The variation in measured $P_{S2D,i}$ from CW to CW is due to IRHP and the true variation in $P_{S2D}$ is due to RSS effects (primarily but not exclusively circumferential media nonuniformity). These can be separated out because the IRHP varies from track to track while the RSS effects are slowly varying and change only over many tracks. Averaging the IRHP over many neighboring tracks causes complete cancellation of the servo-mechanical IRHP effects and yields only the circumferential RSS variation ($RSS_{AC}$) for that region.

$P_{S2D,i}$ is measured over a group of neighboring tracks (e.g, 100 tracks). By measuring repeatable PES also for those tracks, IWIRRO(n) is determined by resampling $P_{S2D,i}$ on a servo wedge basis and subtracting the measured repeatable PES at each wedge. The IWIRRO measurements can be corrected for the $RSS_{AC}$ effects by averaging the IWIRRO over the measured tracks and subtracting the average from each individual measurement.

It should be noted that the IWIRRO measured in this way is not the IWIRRO at a given track position (as is shown in the figure) but rather the IWIRRO is the IWIRRO at the point of code word failure.

In addition to $RSS_{AC}$, the other most prominent degrading RSS effect on track pitch is the accumulating effect of low-level erasure fields from multiple writing of an adjacent track. This is referred to as $RSS_{ATI}$. This is determined by measuring track-averaged $P_{S2D}$ as previously described, but by using an appropriate number of multiple writes for the aggressor track rather than a single write. The $P_{S2D}$ value thus measured will be larger than $P_{S2D}$ for a single-write. The difference, with an accounting for the effects of TMR during the write process, is equal to $RSS_{ATI}$. The previously mentioned $C_{RSS}$ compensation value can now be stated as $C_{RSS} = RSS_{AC} + R_{ATI}$.

Figure 8B:
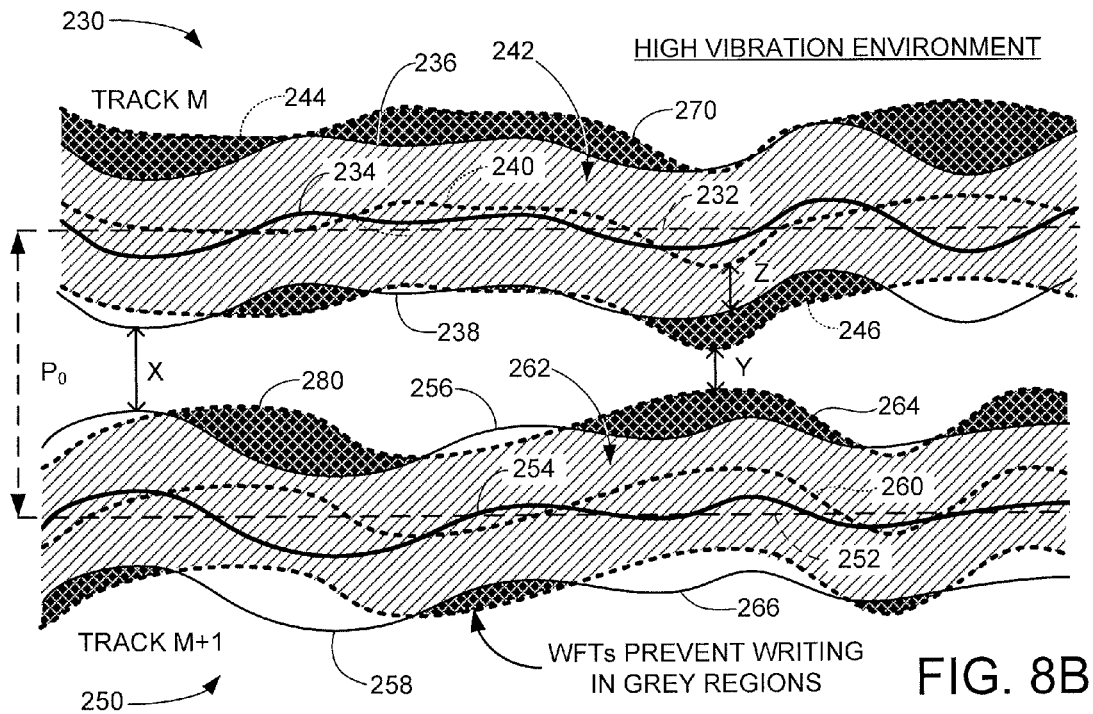

FIG. 8B generally corresponds to FIG. 8A and includes the respective tracks 230, 250 (tracks M and M+1) set forth above, except that FIG. 8B shows the tracks in a relatively high vibration environment. The high vibration environment may correspond to a normal operational environment.

Accordingly, the NRRO banded areas 242, 262 have been expanded (widened) significantly. In some cases the NRRO banded areas 242, 262 exceed the WFT thresholds 236, 238 and 256, 258 of the respective tracks, as denoted by grey cross-hatched regions 270, 280 for the respective tracks M, M+1.

Three different distances X, Y and Z are denoted in FIG. 8B. Distance X represents the closest radial distance between the lower WFT line 238 from track M and the upper WFT line 256 from track M+1. Distance Y represents the closest radial distance between the NRRO banded area 242 for track M and the NRRO banded area 262 for track M+1. Distance Z represents the closest radial distance between the RRO head position line 240 and the lower WFT line 238.

It will be observed that, while the distance Y is less than X, should a write head be located within the corresponding grey regions 270, 280, a write fault will be declared and so data will not be written in these areas. Thus, the location associated with the highest probability of a hard error (failed code word on track M) is at point X, which generally represents the closest point in FIG. 8B where data can be written to both tracks M, M+1. It will be further observed that the highest write fault area for track M is at point Z, since this point generally provides the smallest clearance between lines 238, 240, and is therefore independent of the placement of adjacent track M+1.

Accordingly, for single sided magnetic recording, which can happen on conventional random access type recording, and for shingled or overlapped magnetic recording where aggressor tracks such as M+1 are intentionally written so as to partially overlap target tracks such as track M, hard errors will generally tend to occur in accordance with the following relation:

$$P_{S2D} > P_0 - \text{IWIRRO}(n) - 2*\text{WFT} \qquad (8)$$

where $P_{S2D}$ is discussed above as a radial distance at which a code word failure rate of nominally 50% (CWFR=50%) is achieved; P0 is the nominal track pitch between the tracks, IWIRRO(n) is determined such as in accordance with equation (7), and WFT is specified by the system as the radial distance away from the servo centerline (e.g., lines 234, 254) at which a write fault is declared. An optimum final track pitch $P_0$ between any two tracks can accordingly be selected by measuring $P_{S2D}$ and IWIRRO(n), and specifying WFT. This final track pitch will generally represent the closest track pitch that can be used while maintaining the ability to successfully recover the code words from the target track.

The foregoing examples have discussed single sided track squeeze; that is, target track M is partially overlapped by a single aggressor track M+1. In another embodiment, double sided track squeeze can be considered in which a second aggressor track M−1 also partially overlaps track M. In this case, hard errors due to track squeeze will generally arise in accordance with the following relation:

$$2*P_{S2D} > 2*P_0 - \text{IWIRRO}(n) - 2*\text{WFT} \qquad (9)$$

or $$P_{S2D} > P_0 - 0.5*\text{IWIRRO}(n) - \text{WFT} \qquad (10)$$

Single-sided failure to either side are subsets of double-sided conventional recording and that the optimum track pitch for preserving data for double-sided recording is the worst case between that selected from equation 10 and equation 8, considering both sides.

Figure 9:
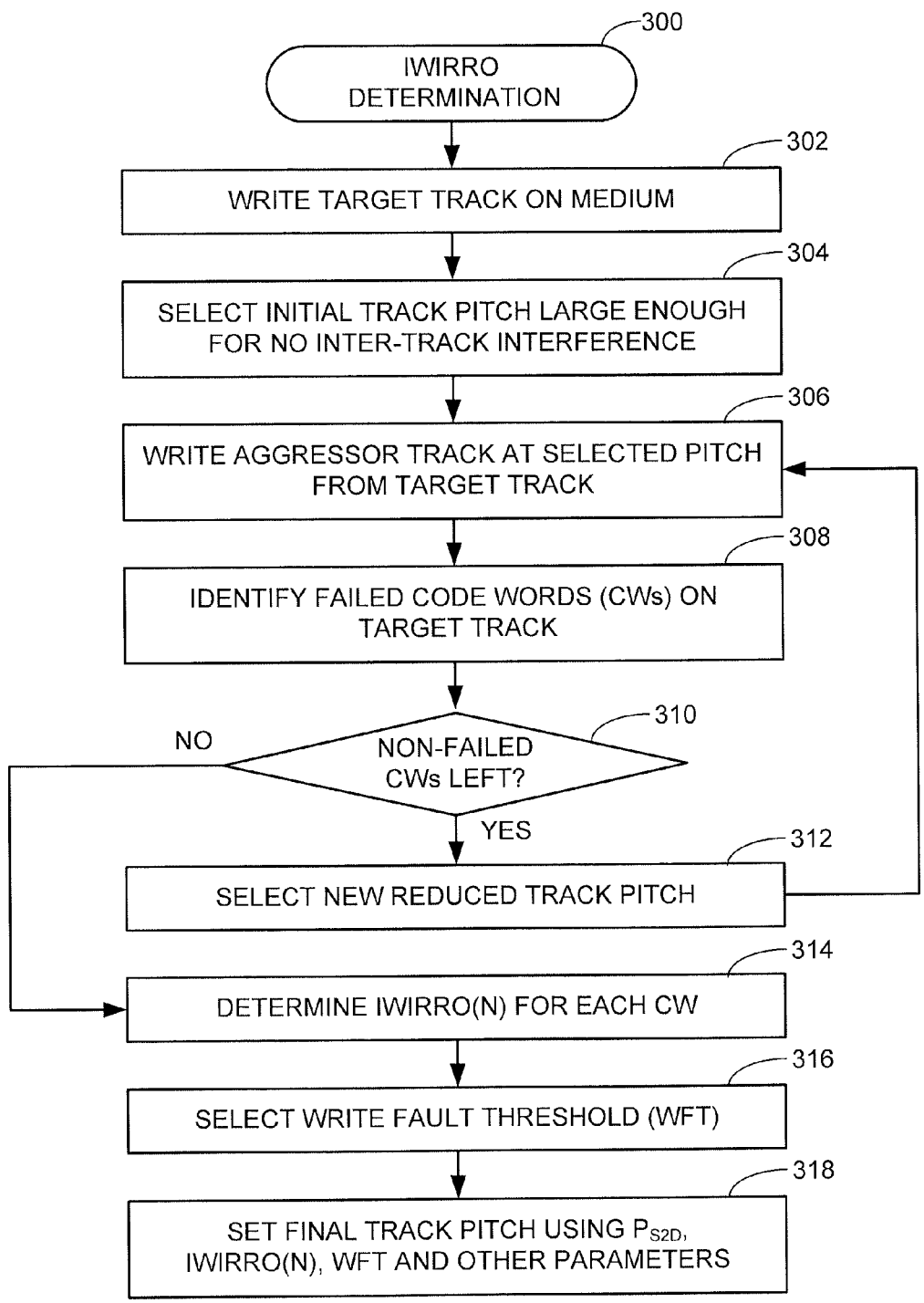
FIG. 9 is another flow chart for a TRACK PITCH DETERMINATION routine carried out in accordance with some embodiments.

FIG. 9 provides a flow chart for another TRACK PITCH DETERMINATION routine 300 generally illustrative of steps that may be carried out in accordance with the foregoing discussion. As before, the routine will be discussed using the example data storage device 110 of FIG. 2 with the respective tracks M, M+1 of FIGS. 7A-8B. Such is merely for purposes of illustration and is not limiting. It is contemplated that the routine will be carried out in a normal operating environment with levels of NRRO components typical of what may be experienced during normal operation. Other conditions can be used.

It is further contemplated that the routine of FIG. 9 will be carried out in lieu of, or in addition to, the routine of FIG. 6. For example, the first portion of FIG. 6 may be carried out to establish suitable $P_{S2D}$ values, and FIG. 9 can be used to subsequently obtain IWIRRO(n) values.

As shown at step 302, a target track is initially written to storage medium, such as the track M on medium 116. As discussed above, this may include the provision of servo data having an RRO component, as represented by servo line 234 (FIG. 7A), and using a servo control circuit 130 (FIG. 2) to cause a write transducer 122 to nominally follow the servo line 234 within WFT limits to write the data.

As before, an initial track pitch P0 is selected for an adjacent aggressor track M+1, step 304. While not necessarily required, it may be desirable to start with a significantly large enough track pitch to ensure no interference between the tracks during initial read cycles.

The aggressor track is written at the specified track pitch at step 306. A read operation is carried out on the target track at step 308 to identify any failed code words on the target track. If any failed code words are identified, such are tabulated in buckets or other data structures for future reference. The then-selected track pitch value may also be recorded.

Decision step 310 determines whether any non-failed code words (CWs) are left on the target track. If so, the process passes to step 312 where a new, reduced track pitch value P0 is selected and a new aggressor track is written adjacent the target track at this reduced track pitch. The process is repeated, each time noting the distance at which each code word was found to fail. In some embodiments, statistically significant numbers of passes are made to establish these distances, so as to reduce the effects of large extreme NRRO values and obtain values that tend to follow the RRO head position paths.

Once all of the code words on the target track have been found to fail due to encroachment by the aggressor track, the routine passes to step 314 where IWIRRO(n) values are determined for each servo sample. As discussed above in equation (7), this can be carried out based on the track pitch values observed during which the various code words failed, since this will provide a two-dimensional topography of the relative distances between the respective tracks.

After determining the IWIRRO(n) values for the respective tracks, suitable write fault threshold (WFT) values are selected at step 316. As discussed above, these can be any suitable values such as nominally +/−15% of overall track width, or some other suitable value. The WFT values can be adjusted (including increased or decreased) in view of the IWIRRO(n) values or other values determined in accordance with this methodology.

Finally, at step 318 the final track pitch values can be determined using the IWIRRO(n) values, the WFT values, and $P_{S2D}$ values for the respective tracks. Other parameters can be utilized as well. These can be determined including by equations (7)-(10).

The foregoing approaches provide a powerful tool set for assessing and specifying a given system. It will be noted that the final track pitch can be determined by the combination of $P_{S2D}$, $C_{RSS}$, IWIRRO(n), and WFT, and to the extent that IWRRO(n) and WFT can be reduced, the final track pitch can be made smaller. These two terms are determined by the servo-mechanical system. While write fault, WFT, protects data on adjacent tracks from being rendered unrecoverable in the presence of adjacent track encroachment by stopping the write operation of the aggressor track, this action results in reduced overall write data throughput. As such, if NRRO were absolutely zero, the WFT term in equations (8) and (10) could be set to zero. If RRO were absolutely zero, then IWIRRO(n) would be absolutely zero, and that term in the equations would also be zero. Under these conditions, the final track pitch would be equal to $P_{S2D}+C_{RSS}$. This is not necessarily realizable in a real device, but this illustrates the concept that $P_{S2D}+C_{RSS}$ represents the highest track density that the recording system components are capable of The $P_{S2D}$ value as determined herein provides an efficient way to determine the capabilities of the recording system independently of the presence of RRO and NRRO components. Similarly, the IWIRRO(n) determinations allow accurate analysis of the RRO and NRRO aspects of the servo-mechanical system. Other factors can be evaluated by these approaches as well, such as media variations, fly height variations and effects, heater settings, heat assisted magnetic recording (HAMR) power settings, etc.

An upper limit may be applied to compensate for adjacent track interference (ATI) effects. For example, a given target track may be rewritten after a total number of writes to the aggressor track, and this limit may be evaluated by measuring $P_{S2D}$.

In still further embodiments, the IWIRRO(n) value (or average thereof, or maximum value thereof) can be used as the $C_{TMR}$ value in the routine of FIG. 6.

It is contemplated that $P_{S2D}$ can be determined during manufacturing of a device and values stored in memory. Subsequent analyses can be carried out at appropriate times during field use of the device, such as at device initialization, during idle times, as part of an error recovery operation, etc. BER or other quality metrics can be tracked and new $P_{S2D}$ values for new, unallocated zones can be established to account for changes to the recording heads, recording system, servo system, etc. over time. Other factors can be used in determining the final track pitch, including temperature measurements, fly heights, etc.

Code words are a useful mechanism for assessing $P_{S2D}$ and other parameters, but such are merely illustrative. In other embodiments, a bit error rate can be calculated to determine, on a bit-by-bit basis, the rate at which bits are encroached by an adjacent track, and a group of bits can pass or fail if the BER exceeds a threshold. One way to do this is to write a test pattern to the target track, retain a copy of the test data in local memory, recover an uncorrected pattern from the target track, and compare the recovered uncorrected pattern to the original data in the memory using a suitable function, such as exclusive-or (XOR), to identify which groups of bits have been deemed failed. In still other embodiments, error metrics can be carried out on data sectors or other groups of data using ECC codes, parity codes, EDC codes, etc. to assess failure (error) rates of the target track.

While various embodiments presented herein have been described in the environment of a hard disc drive, such is merely exemplary and is not limiting. The various embodiments disclosed herein can be used in a variety of applications and systems.

It is to be understood that even though numerous characteristics and advantages of various embodiments of the present disclosure have been set forth in the foregoing description, together with details of the structure and function of various embodiments disclosed, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
writing data to first and second tracks at an initial track pitch such that the second track at least partially overlaps the first track and the data on the first track are arranged in code words each comprising a fixed plurality of bits decoded as a group by a data channel;
transferring the code words from the first track to the data channel; and
determining a final track pitch for subsequent tracks responsive to a distance at which nominally half of the code words are undecodeable by the data channel.

2. The method of claim 1, wherein the determining step comprises determining a minimum track pitch achievable in an absence of track misregistration (TMR) having repeatable runout (RRO) and non-repeatable runout (NRRO) components.

3. The method of claim 2, wherein the determining step further comprises determining the final track pitch responsive to the minimum track pitch and a TMR compensation value.

4. The method of claim 2, wherein the determining step further comprises determining the final track pitch responsive to the minimum track pitch and a written in runout (WIRRO) value indicative of error associated with servo data used to locate the first track.

5. The method of claim 1, wherein the initial track pitch is a first separation distance between an ideal centerline of the first track and an ideal centerline of the second track, and wherein the method further comprises successively writing the second track at reduced track pitches relative to the first track and reading the data from the first track until a baseline track pitch is used that provides a code word failure rate (CWFR) of nominally 50% for the first track, wherein the baseline track pitch represents a minimum separation distance between the target and aggressor tracks that could be used in an absence of track misregistration (TMR) effects.

6. The method of claim 5, further comprising determining the final track pitch in relation to the baseline track pitch in combination with a compensation value to compensate for said TMR effects.

7. The method of claim 1, wherein the data written to the second track are in the form of a second set of code words each form of code words each comprising said fixed plurality of bits decoded as a group by the data channel.

8. The method of claim 1, wherein the first and second tracks are written using a magnetic transducer to a rotatable data recording medium.

9. The method of claim 1, wherein the final track pitch is further determined in relation to a specified write fault threshold value.

10. The method of claim 1, wherein the data channel is a read channel and attempts a code word recovery process to each recovered code word in turn to detect all of the bits in the recovered code word, wherein successful detection provides a recovered code word and unsuccessful detection provides a failed code word allowing a code word failure rate (CWFR) to be determined based on a ratio of a total number of failed code words to a total number of the code words on the first track, and the final track pitch is established responsive to a distance between the first and second tracks at which a CWFR of nominally 50% is obtained.

11. An apparatus comprising:
a read channel configured to decode data retrieved from a data transducer in the form of code words each comprising a plurality of bits; and
a circuit adapted to direct the data transducer to write a first set of code words to a first track and to write a second set of code words to an adjacent second track at an initial track pitch so that the second track partially overlaps the first track, to direct the data transducer to read the first set of code words from the first track, and to determine a final track pitch for subsequent tracks based on unsuccessful detection of about half of the first set of code words from the first track.

12. The apparatus of claim 11, wherein the read channel applies a code word recovery process to each recovered code word in turn in an attempt to detect all of the bits in the recovered code word, successful detection provides a recovered code word, unsuccessful detection provides a failed code word, a CWFR is determined responsive to a ratio of a total number of failed code words to a total number of the code words on the first track, and the final track pitch is selected based on the track pitch that provides a CWFR corresponding to about 50%.

13. The apparatus of claim 11, wherein the determining step comprises determining a minimum track pitch achievable in an absence of track misregistration (TMR) having repeatable runout (RRO) and non-repeatable runout (NRRO) components based on the error rate, and determining the final track pitch responsive to the minimum track pitch and a TMR compensation value.

14. The apparatus of claim 11, wherein the initial track pitch is a first separation distance between an ideal centerline of the first track and an ideal centerline of the second track, and wherein the circuit further operates to successively direct the data transducer to write the second track at reduced track pitches relative to the first track and read the data from the first track until a baseline track pitch is used that provides a data block failure rate of nominally 50% for the first track.

15. The apparatus of claim 11, wherein the circuit is further adapted to determine the final track pitch in relation to a specified write fault threshold value.

16. A system comprising:
a data transducer having a write element and a read element;
a rotatable data recording surface;
a servo control circuit adapted to position the data transducer relative to the recording surface using servo data written thereto;
a write channel adapted to write data to the recording surface in the form of code words, each code word comprising a plurality of bits;
a read channel adapted to read the code words from the recording surface and apply a pass/fail code word recovery operation to attempt to detect all of the bits in each code word in turn; and
a processing circuit adapted to establish a final track pitch for tracks on the recording surface by directing the write element to write code words to a target track, to write an aggressor track adjacent the target track at an initial track pitch, and to successively rewrite the aggressor track at a sequence of reduced track pitches until a minimum track pitch is identified at which nominally 50% of the code words on the target track are successfully recovered using the pass/fail code word recovery operation.

17. The system of claim 16, wherein the processing circuit further establishes a final track pitch in relation to the minimum track pitch and a compensation value to compensate for repeated runout (RRO) and non-repeated runout (NRRO) components.

18. The system of claim 17, wherein the processing circuit further establishes the final track pitch in relation to a written-in runout (WIRRO) value associated with position errors in the servo data on the first track.

19. The system of claim 17, wherein the processing circuit further establishes the final track pitch in relation to a specified write fault threshold value comprising a radial distance between the transducer and the servo data at which the write channel interrupts further writing of data.

20. The system of claim 16, further comprising establishing a final track pitch responsive to the minimum track pitch, and writing a plurality of spaced-apart tracks to the recording surface at the final track pitch.

* * * * *